United States Patent [19]

Kobayashi et al.

[11] 3,715,322

[45] Feb. 6, 1973

[54] EXHAUST GAS CATALYST

[75] Inventors: Shigehiko Kobayashi, Tokyo; Kazuhide Miyazaki, Tokyo; Michaki Yamamoto, Tokyo, all of Japan

[73] Assignee: Mitsui Mining & Smelting Co., Ltd., Tokyo, Japan

[22] Filed: July 28, 1970

[21] Appl. No.: 59,012

[30] Foreign Application Priority Data

| Jan. 10, 1970 | Japan | 45/3093 |
| May 4, 1970 | Japan | 45/38109 |
| May 4, 1970 | Japan | 45/38110 |
| May 4, 1970 | Japan | 45/38111 |
| May 4, 1970 | Japan | 45/38112 |

[52] U.S. Cl. ............... 252/454, 252/463, 252/471, 23/3 E
[51] Int. Cl. ........................... B01j 11/40, B01j 11/06
[58] Field of Search ......... 252/471, 454, 463; 23/2 E

[56] References Cited

UNITED STATES PATENTS

| 3,207,704 | 9/1965 | Stephens et al. | 252/463 |
| 3,214,236 | 10/1965 | Weisz | 252/471 X |
| 3,295,918 | 1/1967 | Briggs et al. | 252/471 X |
| 3,487,016 | 12/1969 | Zeff | 252/471 X |

*Primary Examiner*—C. F. Dees
*Attorney*—Woodhams, Blanchard and Flynn

[57] ABSTRACT

A catalyst comprising manganese oxides and lead oxides is effective in oxidizing and purifying the exhaust gases containing carbon monoxide and is possessed of combustion facilitating effect, and further, a catalyst comprising said manganese oxides and lead oxides together with an oxide of alkali earth elements, transition elements, rare earth elements or such substance as silicon dioxide, aluminum oxide, or such metals as aluminum, copper and iron is extremely effective in oxidizing and purifying the exhaust gas containing carbon monoxide.

10 Claims, No Drawings

EXHAUST GAS CATALYST

BACKGROUND OF THE INVENTION

1. Field of the Invention

The present invention relates to a method of oxidizing and purifying exhaust gases containing carbon monoxide by means of a catalyst comprising manganese oxides and lead oxides, and preferably a catalyst comprising said manganese oxides and lead oxides admixed further with an oxide of alkali earth elements, transition elements, rare earth elements or such substance as silicon dioxide, aluminum oxide, or such metals as aluminum, copper, and iron as well as a method of forming the foregoing catalysts for use in purifying the exhaust gas containing carbon monoxide.

2. Description of the Prior Art

Carbon monoxide is of course a poisonous gas and is discharged in the form of smoke from chimneys of various chemical plants and further as theexhaust gas from gasoline engines for automobiles and the like in such large quantities that it now constitutes a major cause of air pollution. Accordingly, the issue of how to cope with such situation has recently been given serious consideration as a very urgent matter, but despite varieties of studies and propositions made heretofore, no satisfactory solution has been reached yet and there are ardent cries for some effective countermeasure on this matter. And, the same goes with respect to the carbon monoxide arising out of theincomplete combustion in the case of a gas or kerosene stove.

As for the means of oxidizing carbon monoxide, there have been reported instances where a manganese oxide was employed in a gas mask simply as an oxidizing agent. However, a successful employment of this oxidizing agent as an oxidizing catalyst was unprecedented, being practically ineffective when applied to an exhaust gas of a high temperature, such as the exhaust gas discharged from automobiles and gasoline engines, the exhaust gas from factory chimneys, and theincomplete combustion gas from the gas or kerosene stoves used in households, or when employed an intermittent use basis and in a humid atmosphere.

Further, in case of a conventional catalyst, when employed in the form of powder for gas phase reaction, it is apt to fly off and is lost as dust or give rise to such undesirable phenomena as channelling within the packed column, thereby bringing about unfavorable conditions resulting in its insufficient contact with the reaction gas, so that such catalyst is usually put to use after being formed into a solid shape. In the prior art, therefore, it has been conventional to prepare pellets having an appropriate strength and effective porosity through the pelleting process which comprises the steps of admixing the catalyst with a lubricant or binder and subjecting the admixture to a high pressure ranging from several hundred kilograms per cm² to several thousand kilograms per cm². An alternative which has been employed in forming a powdery catalyst is granulation, wherein the catalyst is formed individually or together with a carrier material. But, the conventional catalysts prepared as above, when employed under severe conditions in which they are exposed to a high temperature of more than 400° – 500°C and are shaken continuously in all directions, show defects: for instance, in the case of the pelleting process, zinc stearate added as the lubricant or lignin as binder will be decomposed and volatilized at such a high temperature, resulting in a breakdown of the pellet per se, while such carbon compound as lignin deteriorates remarkably the oxidizing efficiency of the catalyst, due to its strong reducing property. Still anotherproblem generally associated with conventional catalysts has been the ineffective contact of the catalyst bed with the gas to be reacted. Not only the pattern for arranging the catalyst layer in case of the collective employment of such catalyst solids is extremely limited and scrupulous care must be taken to avoid any inclination in disposition of the packed catalyst, but also the efficiency of the catalyst layer as a whole gets remarkably degenerated inasmuch as there is apt to occur nonuniform distribution of catalyst or crevices in the packed layer of catalyst, thereby causing the reactant to readily pass only through the portion having the least flow resistance. On the other hand, in case where the catalyst is compactly packed forcibly in a catalyst packing case, the flow resistance of the reactant gas increases and the catalytic reaction per se gets hampered. As seen in the foregoing the shape of conventional catalyst for use is limited to pellet type, granule type or powder type, and it has been considered almost impossible to give it optional structures, such as grating, meshwork, filament, or bony framework, so as to provide the catalyst in the optimum surface condition or practical form and to maintain a uniform contact with the reactant.

Under such circumstances, the first object of the present invention is to provide a method of purifying exhaust gas by means of catalytically oxidizing carbon monoxide in said exhaust gases containing carbon monoxide and converting it to carbon dioxide gas.

The second object of the present invention is to provide a method of removing carbon monoxide contained in exhaust gases economically and efficiently through an extremely simple device.

The third object of the present invention is to provide purification catalysts suitable for the oxidation and purification of exhaust gases containing carbon monoxide.

The fourth object of the present invention is to provide excellent methods of forming catalyst suitable for the oxidation and purification of exhaust gas containing carbon monoxide.

The fifth object of the present invention is to provide such an oxidizing catalyst as will generate but an extremely small amount of carbon monoxide while being efficient in aiding the combustion.

SUMMARY OF THE INVENTION

The present invention relates to a method of oxidizing and purifying such exhaust gas as containing carbon monoxide by means of combining the functions displayed by manganese oxides and lead oxides in the solid-gas heterogeneous reaction in the presence of carbon monoxide and oxygen at an elevated temperature. The present invention also relates to the effect of a third additive added thereto such as an oxide of alkali earth etals, transition metals or rare earth metals, or silicon dioxide, aluminum oxide, or such metals as aluminum, copper, tin, etc. on the reaction. In this connection, it should be noted that the terms 'mix' or 'combine' appearing in the verbal and noun forms hereinafter do not necessarily define the mixed condition in the strict sense of the word, but comprehensively imply, for instance: the state wherein a thin surface layer of lead oxide or oxides has been formed onto the surface of granular manganese oxide or oxides; or, vice versa, the state wherein a thin surface layer of manganese oxide or oxides has been formed onto the surface of granular lead oxide or oxides; the state wherein a thin layer of lead oxide or oxides has been formed onto a thin layer of manganese oxide or oxides: the state wherein a thin layer of manganese oxide or oxides has been formed onto a thin layer of lead oxide or oxides and further a thin layer of a third additive has been superposed thereon or thereunder: the state wherein the carrier metals consisting of aluminum, copper or iron have been caused to carry manganese oxide or oxides and lead oxides or oxides not to mention of the state wherein the foregoing thin layers have been straticulated.

According to the present invention, as for the catalyst employing a uniform mixture of manganese oxides and lead oxides, the maximum efficiency can be effected when the mixing ratio thereof is about 50 : 50 (in terms of weight ratio), while a full display of the efficiency of the present invention is infeasible when the mixing ratio is apart from the ranges of 10 : 90 — 90: 10. As for the catalyst employing a uniform mixture of manganese oxides, lead oxides and said third additives, the maximum efficiency can be expected when the mixing ratio is about 50 : 50 : (5–10) (in terms of weight ratio), while a full display of the efficiency of said third additives is infeasible when the mixing ratio of the three composites areoutlying from the ranges of 10 : 90 : (2–40)–90 : 10 : (2–40). Besides, according to the foregoing mixing ratios, inasmuch as the atomic weight of manganese and lead is very great compared with oxygen combining them, the amount of oxygen relative to lead can be determined within a comparatively generous range.

Manganese oxides applicable to the present invention include $Mn_2O$, $Mn_3O_4$, and such oxides as $MnO_2$ known as electrolytic manganese dioxide, chemical manganese dioxide or natural manganese dioxide. And, lead oxides applicable to the present invention include $PbO$, $Pb_3O_4$, $Pb_2O_3$ and $PbO_2$. Further, to give example for said third additive applicable to the present invention, as for the oxides of alkali earth metals, transition metals or rare earth metals, it includes iron oxide, nickel oxide, cobalt oxide, yttrium oxide, cerium oxide, lanthanum oxide, etc. along with silicon dioxide, aluminum oxide, copper oxide, or such metals as aluminum, copper and iron. These oxides facilitate the process of catalytic function of said manganese oxides and lead oxides system.

It has been made clear through X-ray analyses that typical reaction mechanism at the time of the contact according to the catalytic method is shown in the following.

$$CO + Mn_2O_3 \quad CO_2 + Mn_3O_4$$

$$Mn_3O_4 + Pb_3O_4 \quad Mn_2O_3 + PbO$$

$$PbO + \tfrac{1}{2}O_2 \quad Pb_3O_4$$

$$CO + \tfrac{1}{2}O_2 \quad CO_2$$

In other words, by effectively utilizing such a device that lead oxides keep quite a firm equilibrium directly with oxygen at arelatively high temperature, the oxidizing function of manganese oxide be elevated to an entirely catalytic nature, and further by means of effecting the reaction continuously, an intensive oxidation of carbon monoxide be performed as if it is effected directly by oxygen in the air.

Typical test results show that the purification catalyst of the present invention consisting of a mixture of manganese oxides and lead oxides is capable of well oxidizing CO in the amount of more than about 100 times as much as the chemical equivalent of the materials that compose said catalyst, and the purification catalyst of the present invention consisting of a mixture comprising manganese oxides, lead oxides and a third additive is capable of well oxidizing CO in the amount of more than about1000 times as much as the chemical equivalent of the materials that compose said catalyst which should be exhibited by thecomposite materials when it is considered that they reacted with the CO simply as an oxidizing agent, respectively. Further, even in case of such exhaust gas as discharged from automobiles where the CO concentration comes up to more than 5 percent at the maximum on the occasion of idling, it is possible to reduce instantaneously such a high concentration of CO to less than 2 percent with a very small amount of said purification catalyst. This effect is attributable to the extremely efficient catalytic action under the present invention which is capable of performing repeated regeneration of oxidizing power automatically via aforementioned reaction mechanism.

Because of such superb catalytic action as discussed in the foregoing, the purification catalyst under the present invention is capable of disposing of a large quantity of exhaust gas for many hours and displaying combustion-aiding effect.

Catalysts in general are extremely susceptible to humidity of the gas to be treated, but the present purification catalyst and combustion-aiding catalyst requires no humidity adjustment and is usable in its natural condition and also in intermittent uses having much opportunity to be exposed to a humid atmosphere. Moreover, it has so far been a matter of common occurrence in case of conventional catalysts that the catalytic action deteriorates rapidly under the influence of a high temperature, but the present purification catalyst and combustion-aidingcatalyst are so thermally resistive that they are not only suitable for use in chemical plants and such combustion devices as gas or kerosene stoves in general households, but also for a wide range of uses involving matters requiring oxidization of carbon monoxide such as theexhaust gas from automobiles, gasoline engines, etc., for which the conventional catalysts available on the market have proved ineffective.

The purification catalyst and combustion-aiding catalyst according to the present invention, when incorporated into a practical apparatus, can well display the desired efficiency with just a small amount thereof packed in said apparatus, and render the design, installation, operation, etc. of the relevant apparatus extremely simple and economical.

The present inventors have proved the method of eliminating the shortcomings of conventional processings incidental to their application to the formation of purification catalyst under the present invention, and come to the finding that said purification catalyst, when mixed and kneaded with such specific aqueous solution or solutions of manganese and lead as causing no deterioration of the catalytic efficiency of said catalyst—for instance an aqueous solution of manganese nitrate—is capable of being formed into a pellet-type catalyst having a satisfactory solidity without resorting to any particular pressure molding, but simply by means of dividing the resultant paste into pieces of appropriate sizes and drying. A catalyst formed through this method can be provided with not only a great strength by virtue of heat drying, but also with a satisfactory porosity which stands comparable to conventional pressure-molded pellets, as a result of dissipation of the volatile components thereof. A full utilization of the merits of the method of the present invention will make it possible to prepare the pellet-type purification catalyst by such means as follows: a manganese nitrate solution is added independently or together with a lead nitrate solution to the powdery catalyst and thoroughly kneaded therein: subsequently, a paste thus obtained is squeezed out, for instance, cylindrically, without applying any particular pressure and cut into pieces of required length: said pieces are subjected to drying at around 100°C for several hours, whereby there are produced pellet-type catalyst. The pellet-type catalyst obtained through such means assumes the form of firm, solid form which could not be rendered by the conventional pressure molding, so that it can retain its original shape without suffering the breakdown of the pellet per se even when placed under such severe conditions that the catalyst-packed bed is continuously subjected to up-and-down shakes, not to mention of the case of stationary conditions displaying a satisfactory catalytic efficiency. Besides, inasmuch as this means does not employ such a pressure as in the case of the conventional pressure-molding, it never gives rise to such troubles as the mechanical wear of the production dice or the like, and, on top of that, is suitable for continuous mass production. Further, the present inventors have also come to a finding, in respect of the means of retaining a uniform disposition of the catalyst within the catalyst-packing case, that: in case where such ceramic material as waterglass, low melting point glass, etc. is applied as a binder, by means of pressure adhesion or coating, onto a portion of the surfaces of respective pellets are placed in the catalyst-packing case in such a state as ready for employment of the catalyst and subjected to a provisional heating at a temperature of several hundred degrees, C, there is produced melted glass on the surface of each pellet-type catalyst and individual pellet-type catalysts are interlinked firmly with one another by a portion of the surface, resulting in the formation of catalyst of a collective skeletal structure. The catalyst of a skeletal structure thus obtained does not give rise to such an inclination of catayst bed as seen in the case of the foregoing pellet-type catalyst at large, but allows the reactant gas to flow uniformly within the catalyst-packing case. Moreover, there occurs no decrease in the porosity of individual pellets per se along with the space retained in between them by virtue of the adhesion of a ceramic binder, it can fully display the proper efficiency of the catalyst.

The purification catalyst according to the present invention can be used in various fashions. In case where the powdery catalyst is employed it is possible to get the present catalyst adhered to and carried by any pattern of use by virtue of the intrinsic shape pliability of the substrate through the proper use of binder. One of the most excellent methods of forming the catalysts under the present invention is the method which features in that a grating-type metal work is employed as a third additive and as a carrier at the same time:namely, such metals as aluminum, copper, iron, etc. can be made to carry manganese oxides and lead oxides, and the grating or the mesh-works per se thus prepared function as the purification catalyst according to the present invention which assumes a skeletal structure and a mesh-work structure, it has varieties of industrial merits such, for instance, that it demonstrates excellent efficiency in oxidizing and purifying exhaust gases containing carbon monoxide when disposed in a catalyst-packing case installed in the chimneys of plants or the exhaust channel of automobiles, and therefore, its practical value is indeed enormous.

DESCRIPTION OF THE PREFERRED EMBODIMENTS

Described hereunder are examples embodying the concept of the present invention, but the scope of the present invention is not necessarily limited thereby.

Example 1

The description herein pertains to four patterns of embodiment of the present invention, based on four combinations of the following compounds: namely, electrolytic manganese dioxide ($MnO_2$) chemical manganese dioxide ($MnO_2$), natural manganese dioxide ($MnO_2$) and lower oxides of manganese ($Mn_2O_3$, $Mn_3O_4$, etc.) selected as the manganese oxide: triplumbic tetroxide ($Pb_3O_4$) and lead monoxide (PbO) selected as the lead oxide. The exhaust gas having a composition shown in the following Table 1 as being discharged from a commercial gasoline engine was made to pas through a pipe of 23mm in diameter at the rate of 600 cc/min while maintaining the temperature of said exhaust gas at 400°–500°C. Inside the pipe, there was 3g of the catalyst pellets of the present invention formed to be about 10mm$\phi$ and 3 mm thick. As for the condition of treatment of the exhaust gas, such operations are repeated that the exhaust gas is made to flow for 8 consecutive hours per day, and after 16 hours' stoppage subsequent thereto, it is again made to flow for another 8 consecutive hours. Analyses of the CO concentration were conducted by means of gas chromatographs obtained at both the inlet and outlet of the pipe. The CO concentration of the inlet was 5 percent, and the integrated durable hours while the catalyst reduced the CO concentration of the outlet gas to 0–2 percent was measured as the capacity of each catalyst.

For the purpose of comparing with the efficiency observed in the foregoing test, similar test was also conducted with conventional CO oxidizer called Hopcalite as control.

The purification efficiencies for carbon monoxide observed from these tests are as shown in Table 1, which proves that the purification method according to the present invention could enhance the carbon monoxide purification efficiency by more than 400 percent as compared with conventional methods employing the known oxidizing agents.

As seen from the foregoing description as well as the results of the purification tests shown in Tables 1 and 2 for the examples herein, the efficiency in purifying the exhaust gas containing carbon monoxide of the purification catalyst according to the present invention can be further enhanced by means of adding such alkali earth oxides transition metal oxides, or rare earth oxides as shown in Table 2, as a third additive, to a mixture of manganese oxide and lead oxide, and the method of purification under the present invention could enhance the carbon monoxide purification effi-

| Examples | | Treating agents employed | Integrated durable hours in intermittent application (hr.) | CO concentration of gas measured by hours of application (percent) | | | | | |
|---|---|---|---|---|---|---|---|---|---|
| | | | | 1 | 5 | 10 | 20 | 40 | 70 | 90 |
| Method under the present invention. | 1 | Triplumbic tetroxide and hausmannite | 40 | 1.0 | 1.2 | 1.3 | 1.5 | 2.0 | | |
| | 2 | Triplumbic tetroxide and natural manganese dioxide | 69 | 0.9 | 0.9 | 0.9 | 1.0 | 1.3 | 2.1 | |
| | 3 | Triplumbic tetroxide and electrolytic manganese | 95 | 0.7 | 0.7 | 0.8 | 0.9 | 1.0 | 1.2 | 1.9 |
| | 4 | Lead monoxide and electrolytic manganese dioxide | | 1.2 | 2.0 | 1.8 | 1.5 | 1.7 | 2.0 | |
| Comparative methods | 5 | Triplumbic tetroxide | 0 | 4.1 | 5.0 | | | | | |
| | 6 | Hausmannite | 1 | 1.9 | 3.5 | | | | | |
| | 7 | Natural manganese dioxide | 5 | 1.5 | 2.0 | | | | | |
| | 8 | Electrolytic manganese dioxide | 10 | 1.0 | 1.5 | 2.0 | | | | |
| | 9 | Conventional carbon monoxide oxidizer (trade name: Hopcalite) | 22 | 1.0 | 1.2 | 1.4 | 1.9 | | | |

Example 2

The description herein pertains to seven patterns of embodiment of the present invention, based on seven combinations of the following compounds: namely, electrolytic manganese dioxide ($MnO_2$) selected as the manganese oxide: trimplumbic tetroxide ($Pb_3O_4$) selected as the lead oxide: and magnesium oxide ($MgO$), nickel oxide ($NiO$), copper oxide ($CuO$), yttrium oxide ($Y_2O_3$), cerium oxide ($CeO_2$), silicon dioxide ($SiO_2$) and aluminum oxide ($Al_2O_3$) as the third additve to be combined with them. The exhaust gas being discharged from a gasoline engine employing a leaded gasoline having a composition shown in the below-mentioned Table 2 was made to pass through a pipe of 50mm in diameter at the rate of 100 1/min while maintaining the temperature of said exhaust gas at 400°–500°C. Inside the pipe, there was 300g of the catalyst pellets formed to be about 6mm $\phi$ and 3mm thick. The space velocity on this occasion was regulated to be 30,000/H. As for the conditionof treatment of the exhaust gas and analyses of the CO concentrations were same as that of Example 1. For the purpose of the test in this example, the exhaust gas being discharged from a gasoline engine employing a leaded gasoline and having 9 percent concentration of CO was employed as the sample for test, and, by subjecting said sample gas to the purification treatmeng, the integrated durable hours while the catalyst reduced the CO concentration of the outlet gas to 0–2 percent was measured thereby confirm the efficiency of the present method.

ciency by more than 600 percent as compared with conventional methods employing the known oxidizing agent, and by more than 150 percent as compared with the method employing a purification catalyst consisting of the mixture of manganese oxides and lead oxides alone.

Table-2

Result of Carbon Monoxide Purification Tests

Composition of the sample gas (in case where leaded gasoline was employed)

$CO = 9\%, O_2 = 29\%, N_2 = 75\%, CO_2 = 4\%,$
CH & others $= 5\%$

Composition of the present purification catalyst manganese oxide:lead oxide:the third oxide = 50: 50: (50 - 10) (% by weight)

| Examples | | Treating agents employed (the 3rd additive), percent | | Integrated durable hours in intermittent application (hr.) | CO concentration of exhaust gas measured by hours of application, (percent) | | | | | |
|---|---|---|---|---|---|---|---|---|---|---|
| | | | | | 10 | 16 | 30 | 50 | 75 | 100 |
| Purification catalyst under the present invention. | 1 | Magnesium oxide | 5 | More than 100 | 0 | 0 | 0 | 0 | 0 | 0 |
| | 2 | Nickel oxide | 10 | do | 0 | 0 | 0 | 0 | 0 | 0.5 |
| | 3 | Copper oxide | 10 | do | 0 | 0 | 0 | 0 | 0 | 0.3 |
| | 4 | Yttrium oxide | 5 | do | 0 | 0 | 0 | 0 | 0 | 0 |
| | 5 | Cerium oxide | 5 | do | 0 | 0 | 0 | 0 | 0 | 0.2 |
| | 6 | Silicon dioxide | 10 | do | 0 | 0 | 0 | 0 | 0.4 | 0.8 |
| | 7 | Aluminum oxide | 10 | do | 0 | 0 | 0 | 0 | 0.3 | 0.6 |
| Conventional carbon monoxide oxidizer | | | | 16 | 0.8 | 2.0 | | | | |

EXAMPLE 3

A 15 percent aqueous solution comprising 3 parts by weight of manganese nitrate was added to 100 parts by weight of powdery catalyst comprising manganese dioxide and triplumbic tetroxide. This mixture, after being thoroughly kneaded, was extruded by a cylindrical extruder of 10mm$\phi$ in inside diameter to form a pencil-shaped extrusion, and said extrusion was then divided into pellets of 3mm thick and dried at 100°C for 10 hours. The post-drying strength of thus prepared pellet-type catalyst showed 450 percent enhancement as compared with similar catalysts obtained through conventional pressure molding method, and also displayed 10 percent increase in the carbon monoxide oxidizability thereof.

Table-3

Comparative Efficiency of Extrusion-molded Pellet-type Catalyst

|  | porosity (%) | relative strength (kg) | CO oxidizability (equivalent) |
|---|---|---|---|
| Pellet-type catalyst under the present invention | 25 30 | 9.0 | 800 |
| Pellet-type catalyst- -under low according- -pressure to conventional pressure- -under high molding- -pressure | 25 30 | 2.0 | 700 |
|  | 16 20 | 3.0 | 600 |
| Commercial catalyst A | 28 | 7.0 | — |

In this connection, it is to be noted that in case where manganese nitrate was replaced by an aqueous solution of lead nitrate or an aqueous solution of the mixture of said manganese nitrate and lead nitrate, there was obtained a solid catalyst having a strength equal to the present one as well as an excellent efficiency.

The inventors of the present invention have further proceeded with studies on how to better shape the powdery catalyst with a view to overcome the limitations of utilization of the foregoing pellet-type catalyst and expanding the scope of application thereof, and have come to find a novel andunique method for formation of catalyst, which is entirely different from such conventional means as based on theconcept of congregating the molded solids. In aword, this novel method consists essentially of the steps that a specific shape required for the intended catalyst is first built by employing such substrate as metals, ceramics, etc. and, therefore, the surface of thus shaped substrate is coated with the powdery catalyst. More particularly, this method features in that the powdery catalyst is to be caused to adhere directly onto said substrate of catalyst together with a specific metal or ceramic binder, or some inorganic or organic binder. In other words, a 100-mesh stainless-steel wire gauze was first prepared, and subsequently apowdery catalyst according to the present invention mixed with aluminum powder was applied by means of a melt-sprayer onto said stainless-steel wire gauze, whereby the present powdery catalyst is made to adhere onto said stainless-steel wire gauze. As an alternative to the foregoing, said substrate consisting of wire gauze may be first coated with the powdery catalyst of the present invention by means of a binder, and subsequently a melt-spraying of aluminum or copper is performed. Thus formed catalyst structure, because of its being composed collectively of such components of catalyst, substrate and surface coating film provided with an extremely large contact area to come into direct contact with the reactant gas, can demonstrate a remarkably improved catalytic efficiency per unit weight as compared with conventional compressed powder type catalyst, and, in addition, the mechanical strength of this catalyst is as great as that of the substrate perse. Further, the foregoing method of formation is not only applicable to thepurification catalyst according to the present invention, but also well applicable in the case of forming general catalysts. Ceramic frame works also make a good substrate as well as the metallic structure to conduct the process of the present invention.

Example 4

On the occasion of preparing a pellet-type catalyst of 10mm$\phi$ and 5mm thick from apowdery catalyst comprising manganese oxides and lead oxides by means of a pressure-molding machine, by applying the process comprising steps—namely, a ceramic material consisting of silicate of soda and the burned product of pearlite is first placed in pressure-molding dice: the foregoing powdery catalyst is next placed onto said ceramic materials: then, the same ceramic materials as above are further superposed thereon: and subsequently, thus disposed components are subjected to pressure-molding-both the top and bottom sides of the resultant pellet-type catalyst can be covered respectively with a thin film of said ceramic materials firmly adhered thereto by pressure.

This pellet-type catalyst carrying said ceramic materials was put in a cylnindrical receptacle and subjected to 5 hours' provisional heating in the atmosphere of oxygen while keeping the temperature at 400°–500°C, showed the formation of ceramics of a low melting point on both the top and bottom sides of said pellet-type catalyst, resulting in the formation of a collective skeletal structure consisting of individual pellets interlinked with one another and still having such a grape-like structure, when applied under a convulsive condition, did not give rise to any such inclination of the catalyst bed as scatteringand chanelling encountered in the case of the employment of individual pellet-type catalysts and the effective duration of carbon monoxide oxidizability thereof showed about 400 percent increase.

What we claim is:

1. A catalyst composition for substantially oxidizing carbon monoxide in the exhaust gas from a combustion operation, consisting essentially of (a) lead oxide selected from the group consisting of $PbO$, $Pb_3O_4$, $Pb_2O_3$, $PbO_2$ and mixtures thereof, and (b) manganese oxide selected from the group consisting of $Mn_2O_3$, $Mn_3O_4$, $MnO_2$ and mixtures thereof, the weight ratio of a : b being in the range of 10 : 90 to 90 : 10.

2. A catalyst according to claim 1, in which the weight ratio of a : b is about 50 : 50.

3. A catalyst according to claim 1, in pellet form and containing manganese nitrate or lead nitrate, or both as abinder.

4. A catalyst according to claim 1, in pellet form and a ceramic binderbonding together the pellets to form a unitary mass.

5. A catalyst according to claim 1, attached to a metal or ceramic framework as a carrier.

6. A catalyst composition for substantially oxidizing carbon monoxide in the exhaust gas from a combustion operation, consisting essentially of (a) lead oxide selected from the group consisting of $PbO$, $Pb_3O_4$, $Pb_2O_3$, $PbO_2$ and mixtures thereof, (b) manganese oxide selected from the group consisting of $Mn_2O_3$, $Mn_3O_4$, $MnO_2$ and mixtures thereof, and (c) at least one material selected from the group consisting of the oxides of alkaline earth metals, transition metals and rare earth metals, copper oxide, silicon dioxide, aluminum oxide, aluminum metal, copper metal and iron metal, the weight ratio of a : b : c being in the range of 10 : 90 : 2–40 to 90 : 10 : 2–40.

7. A catalyst according to claim 6, in which the weight ratio of a : b : c is about 50 : 50 : 5–10.

8. A catalyst according to claim 6, in pellet form and containing manganese nitrate or lead nitrate, or both as a binder.

9. A catalyst according to claim 6, in pellet form and a ceramic binder bonding together the pellets to form a unitary mass.

10. A catalyst according to claim 6, attached to a metal or ceramic framework as a carrier.

* * * * *